Aug. 6, 1940.    A. E. McCORMACK    2,209,949
POWER TRANSMISSION DEVICE
Filed June 21, 1938    3 Sheets-Sheet 1
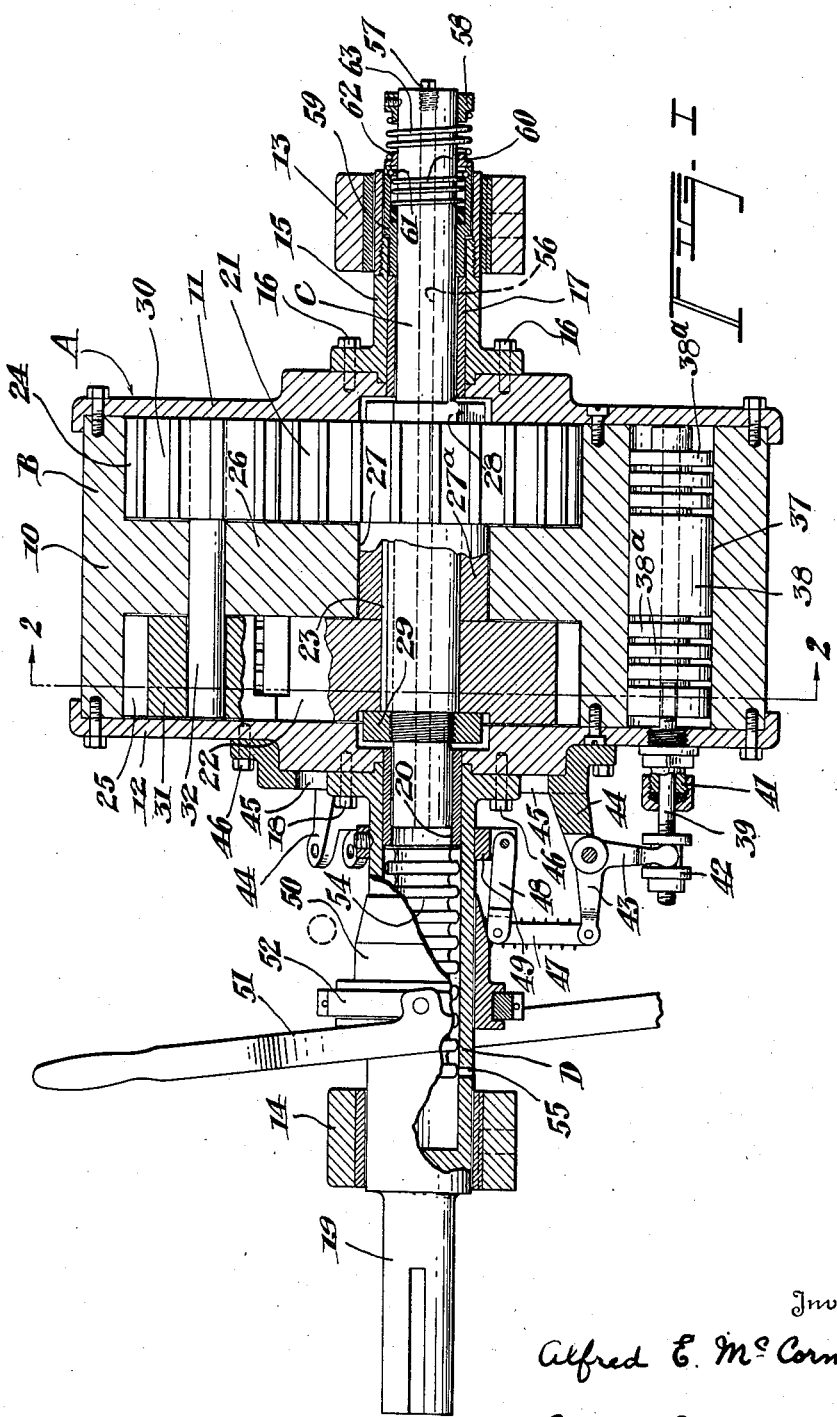
Inventor
Alfred E. McCormack
By Eugene E. Stevens
Attorney Aug. 6, 1940.  A. E. McCORMACK  2,209,949
POWER TRANSMISSION DEVICE
Filed June 21, 1938  3 Sheets-Sheet 2
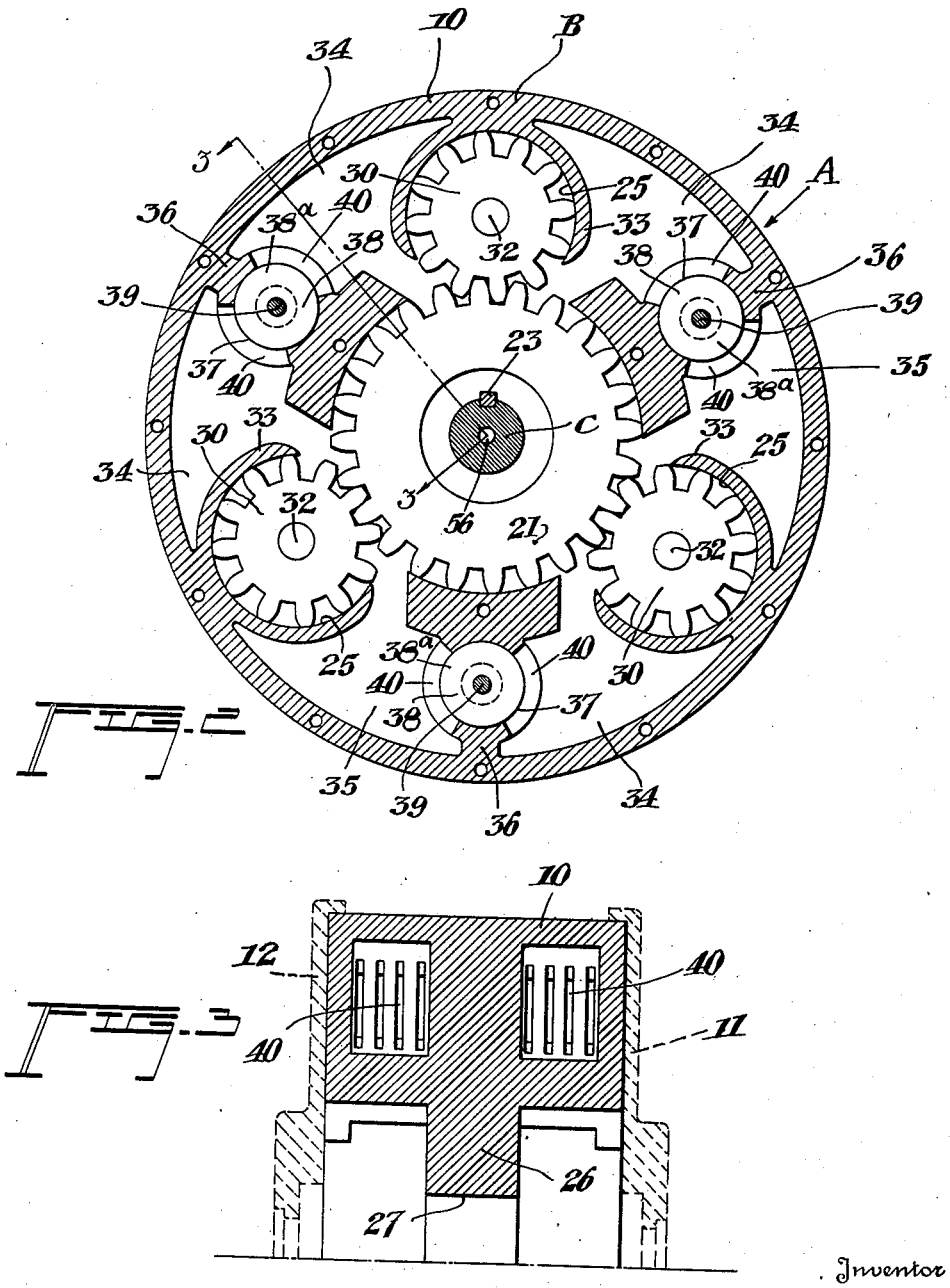
Inventor
Alfred E. McCormack
By Eugene E. Stevens
Attorney Aug. 6, 1940.  A. E. McCORMACK  2,209,949
POWER TRANSMISSION DEVICE
Filed June 21, 1938  3 Sheets-Sheet 3
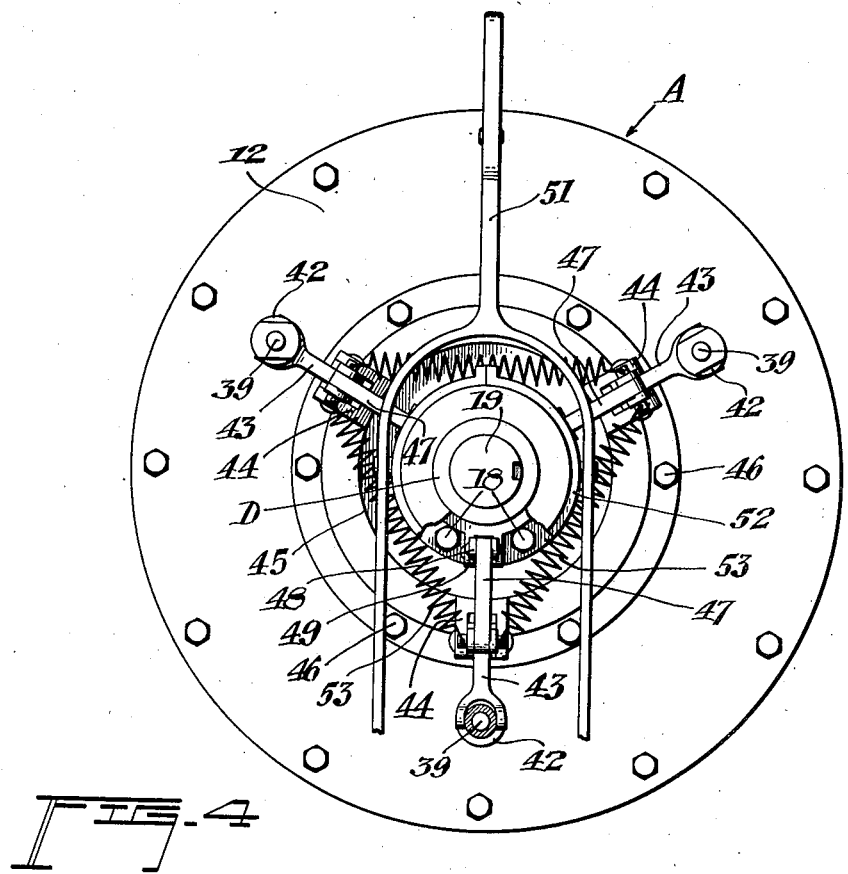
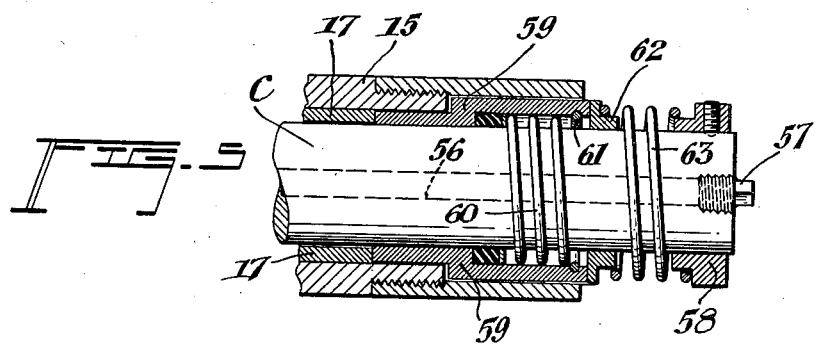
Inventor
Alfred E. McCormack
By Eugene E. Stevens
Attorney Patented Aug. 6, 1940

2,209,949

UNITED STATES PATENT OFFICE 2,209,949

POWER TRANSMISSION DEVICE

Alfred Edward McCormack, Winnipeg, Manitoba, Canada

Application June 21, 1938, Serial No. 215,017

3 Claims. (Cl. 192—61)

This invention relates to power transmission devices and particularly to a device employing a liquid resistance medium and designed to perform the functions of a clutch and transmission.

It is a main object of the present invention to provide a compact unit which will function as a combined clutch and transmission permitting a variable speed drive wherein the speed of the driven shaft may be changed smoothly and gradually and clutch action obtained simultaneously through the operation of one controlling member.

A further object of the invention is to provide a device of this kind which may be widely employed in the field of power transmission.

A still further object of the invention is to provide a device of this kind which may be constructed economically.

With these and other objects in view the invention consists essentially in a unit designed to be connected between a driving and driven shaft and carrying a liquid resistance medium which forms the power transmitting means, the flow of liquid being controlled by manually operable means to establish or disestablish driving connection between the shafts. The flow controlling means for the liquid is designed to be variably adjusted so that the speed of rotation of the driven shaft can be varied as desired.

The construction, operation and advantages of the invention will be fully apparent upon considering the following detailed specification taken in conjunction with the accompanying drawings.

In the drawings:

Figure 1 is a transverse section taken through the power transmitting device to illustrate the various co-operating parts of the structure, a portion of the driven shaft and a portion of the operating means being shown fragmentarily in side elevation.

Figure 2 is a transverse section taken on the line 2—2 of Figure 1.

Figure 3 is an enlarged detail section taken on the line 3—3 of Figure 2.

Figure 4 is an elevation of the rearward end of the device, and

Figure 5 is an enlarged fragmentary section of the forward end of the driving shaft illustrating the proposed sealing construction preventing loss of the liquid medium.

Referring to the drawings, A indicates the power transmission device as a whole, including the power transmitting unit B which is coupled with the drive shaft C and driven shaft D. The distributing unit B is in the form of a general housing made up of the distributing ring 10 and end covers 11 and 12 suitably bolted thereto. The distributing unit is designed to rotate when power is to be transmitted to the driven shaft D and is therefore rotatably mounted at each end in bearings 13 and 14, the bearing 13 having a hollow shaft or sleeve 15 journalled therein and bolted at 16 or otherwise secured to the end plate or cover 11 on the housing. The hollow shaft or sleeve 15 is designed to encircle the driving shaft C, provided with a suitable internal bearing 17.

On the other side of the unit, the driven shaft is bolted as at 18 or otherwise suitably secured to the end plate or cover 12 and the driven shaft itself is journalled in the bearing 14 and provided with an extension 19 to be coupled to the power receiving means.

The drive shaft C projects within the unit B, being journalled at its opposite end in a suitable bearing 20 disposed in one end of the hollow driven shaft D, and within the unit it has mounted thereon a pair of spaced apart main gears 21 and 22 which are keyed to the shaft as at 23. The distributor ring is provided with annular recesses 24 and 25 on each side, which provides a housing for the gears 21 and 22 and the centre part of the ring is left solid as at 26 to extend in towards the driving shaft, the centre part being provided with a bore 27 to permit the driving shaft to pass therethrough and to house a sleeve bearing 27ᵃ surrounding the driving shaft and keyed thereto by the key 23.

The gears 21 and 22 and bearing 27ᵃ are held in set position within the unit by means of the nuts 28 and 29 screw threaded on the drive shaft and housed within suitable recesses formed in the power transmitting unit, such as in the cover plates 11 and 12 and partially within recesses in the gears 21 and 22.

A series of pairs of pinion gears 30 and 31 are housed within the recesses 24 and 25 of the power transmitting unit and designed to mesh with the gears 21 and 22. The arrangement of one series of gears is clearly shown in Fig. 2 disposed in planetary relation with the gear 21. These pinion gears are mounted on common shafts 32 which project through the solid portion of the distributing ring 10. A major portion of these pinion gears are encircled by casings 33, and it will be seen that the pinion gears and their casings will divide the recesses 24 and 25 into a series of three chambers on each end of the unit. These chambers are in turn divided into compartments 34 and 35 respectively by partitions 36 which are of special formation to provide the valve housings 37 carrying valve plungers 38, the structure of which will be described in detail hereinafter.

The chambers and consequently the compartments 34 and 35 are designed to be filled with a liquid such as oil, and this liquid in effect constitutes the power transmitting means. For instance, it will be appreciated that as the various chambers of the power transmitting unit B are filled with oil and the valves 38 are open so as to permit a free flow of the oil within the unit, each series of pinion gears 30 and 31 will rotate freely when driven by the gears 21 and 22 as the driving shaft C rotates. Thus, the power transmitting unit is in neutral, and no motion is imparted to the driven shaft D. However, if the valves 38 which control the flow of the liquid from one compartment to the other are shut, no movement of the oil will take place and consequently the series of pinion gears 30 and 31 will be locked with their respective drive gears 21 and 22 and thus, the power transmitting unit B will be caused to rotate, thus rotating the driven shaft D. Through this means, as will appear, a varied speed of rotation of the drive shaft may be obtained.

The valves 38 or flow controlling means for the liquid in the unit may be formed as shown particularly in Fig. 1 provided with a series of spaced apart valve elements or discs 38ª which are designed to cooperate with a series of valve ports 40 (see Fig. 3) disposed in the walls of the valve housing 37, there being a series of these ports on each side of the valve housing, so as to establish communication through the valve housing between each compartment 34 and 35 of the several series.

The structure is designed so that the valve members 38ª may be adjusted to a relatively minute degree in respect to the valve ports 40, so that these ports may be opened very gradually and to different degrees. Consequently the transmitting unit B can be caused to rotate at varying speeds. For instance, if the valve ports are open wide, the gears 21 and 22 and their meshing pinions 30 and 31 rotate freely since the liquid will flow freely. If, however, the valve ports are restricted to a slight degree by the valve members 38ª, the obstruction in the flow of liquid between the compartments and the resistance thus resulting, will cause the housing to rotate at a low speed and similarly if the ports are restricted to a greater degree, the housing is caused to rotate faster until it develops a maximum driving speed when the ports are fully closed. In this way the power transmitting device has both the use of a clutch and transmission, since it functions to set the driving shaft in motion and also functions to cause it to rotate at varying speeds according to the setting of the flow controlling valves.

The valves 38 are provided with suitable valve stems 39 designed to project through openings in the cover 12 by way of suitable fittings including a packing gland 41 and on the projecting free end of the valve stems a suitable fitting such as a shifting spool 42 is mounted, each of which may be engaged by the bifurcated arm of bell crank levers 43 which may be pivotally mounted by means of the projecting bifurcated arms 44 of a spider 45 bolted on the end plate of the cover 12 as at 46. The opposite ends of these bell crank levers are pivotally connected to links 47 which in turn are pivotally connected by links 48 to a collar 49 or other suitable fitting which lends a desirable anchorage for the required articulated connection. The pivotal connection between the links 47 and 48 of each set may occur adjacent to the driven shaft D and on the driven shaft a tapered valve actuating sleeve or spool 50 is mounted so that its tapered end is adjacent to this pivotal connection. This spool may be provided with a lever 51 or pedal or other suitable actuating means connected in any suitable way such as by a freely mounted ring 52 so that when the lever or actuating means 51 is moved to the right the tapered end of the spool 50 will gradually come into engagement with the common pivotal point of each set of the links 47 and 48, thus moving the links 47 outwardly and rotating bell crank levers 43 about their pivots to move the valve stems and connected valve structure inwardly to an extent corresponding to the movement of the spool 50.

The inward movement of the valves 38 has the effect of closing the ports 40 between each pair of compartments 34 and 35 to a degree corresponding with the movement imparted. These valves when in neutral are normally held open so that the power transmitting unit is in neutral, and they are held in this section by means of springs, such as a series of coil springs 53, which are shown more particularly in Figure 4 and extend between the link connected arms of the bell crank levers 43 where they are suitably anchored. Thus, they hold these bell crank levers under tension and through them normally maintain the valves open. In this way, therefore, it is clear that the valve may be operated to any desired degree between the full open and full closed position of the ports to cause the power transmitting unit to rotate the drive shaft at the speed required, and the valves are returned to normal neutral position when the operating member is released.

In order to provide against expansion of the oil or fluid used within the power transmitting unit, due for instance to temperature variations, the hollow driven shaft carries an expansion device, such as bellows 54, which is sealed in communication with the oil system. In this connection the bellows is soldered or otherwise secured to the bearing bushing 20 which is then inserted in a press fit in its mounting. The bellows is then in communication with the oil system via the clearance between the shaft and the bearing bushing 20. The hollow driven shaft is provided with a vent 55 which vents the interior of the shaft to the atmosphere and thus the bellows may be permitted to expand when required under normal atmospheric conditions. The oil or other liquid is suitably sealed within the power transmitting unit and may be introduced through a bore 56 in the driving shaft C which is closed at one end by a suitable plug 57. The driving shaft is designed to be coupled with the power unit by means of a suitable coupler 58 and the shaft may be sealed by way of a packing gland 59 employing a packing spring 60 and locking ring 61 over which is applied a gland thrust collar 62 and gland spring 63.

It will be apparent from the foregoing that the construction involved provides a relatively simple, compact unit through which clutch action and power transmission is effected by the sole operation of a single operating member. The slight actuation of the operating member will cause a variation in the speed of the driven shaft and it will be apparent, therefore, that power can be applied to the driving shaft in a varied number of ratios. For instance, when compared with the conventional gear shift and separate clutch construction of an automobile, it is readily apparent that not only does the device eliminate a large number of parts which require varied operations and are subject to wear but instead of two or three preliminary speeds effected through gear shifting the present device will permit of a number of speeds gradually built up as desired to a maximum.

By employing an operation liquid such as oil, it will be appreciated that the parts are always subject to constant and efficient lubrication and that wear is reduced to a minimum. It will, of course, be appreciated that additions might be made to the structure, such as the inclusion of an auxiliary oil supply tank, gauges and the like, if these are required.

Various modifications may be made in the invention without departing from the spirit thereof or the scope of the claims and, therefore, the exact forms shown are to be taken as illustrative only and not in a limiting sense, and I desire that only such limitations shall be placed thereon as are imposed by the prior art or are specifically set forth in the appended claims.

I claim:

1. A power transmission device comprising a unit designed to be connected between a driving and a driven shaft, a pair of spaced apart main gears keyed on said driving shaft and disposed within the unit, said driving shaft and main gears being rotatable relatively to said unit, a plurality of spaced apart pairs of pinions rotatably mounted in said unit and meshing respectively with said main gears, a plurality of chambers in said unit disposed around said main gears and between said pinions, a liquid in said chambers forming the power transmitting medium, said liquid being freely transferred from one chamber to another by said gears upon rotation of the driving shaft, said driven shaft being rigidly connected to the unit and having a hollow portion communicating with the interior of the unit, the inner end of the driving shaft being rotatably housed within the hollow end of the driven shaft, and means within said hollow shaft for accommodating expansion of the liquid in the unit.

2. A power transmission device comprising a unit designed to be connected between a driving and a driven shaft, a main gear within said unit keyed to the driving shaft, said driving shaft and main gear being rotatable relatively to said unit, a series of pinions rotatably mounted in said unit and meshing with said main gear, casings surrounding a portion of said pinions, a plurality of chambers in said unit disposed around said main gear and formed by said pinions and casings, a liquid in said chambers forming the power transmitting medium, said liquid being freely transferred from one chamber to another by said gears upon rotation of the driving shaft means for varying and shutting off communication between said chambers to cause said liquid to set up resistance to the rotation of said gears whereby said unit is caused to rotate, thus to rotate the driven shaft, a hollow portion in said driven shaft and an expansible bellows mounted within said hollow portion to accommodate expansion of liquid in the unit.

3. A power transmission device comprising a unit designed to be connected between a driving and a driven shaft, said driving shaft being designed to project into said unit and rotate relatively thereto, said driven shaft being rigidly connected to the unit and rotatable therewith, a pair of spaced apart main gears keyed on said shaft and disposed within the unit, a plurality of spaced apart pairs of pinions rotatably mounted in said unit and meshing respectively with said main gears, a plurality of chambers in said unit disposed around said main gears and between said pinions, a partition in said chambers forming pairs of compartments, a liquid in said compartments forming a power transmitting medium, ports in said partitions permitting said liquid to be freely transferred from one compartment to another and from one chamber to another by said gears upon rotation of the driving shaft, valve means controlling the ports of said partitions for varying and shutting off communication between said chambers to cause said liquid to set up resistance to the rotation of said gears whereby said unit is caused to rotate under power of the driving shaft, thus to rotate the driven shaft, manually operable means connected with said valve means operable to control rotation of said unit and its speed of rotation, a hollow portion in said driven shaft communicating with the interior of the unit, the inner end of the driving shaft being rotatably housed within the said hollow portion and an expansible bellows member within said hollow portion serving to make accommodation for expansion of the liquid in the unit.

ALFRED EDWARD McCORMACK.